United States Patent
Savagaonkar et al.

(10) Patent No.: US 8,341,369 B2
(45) Date of Patent: *Dec. 25, 2012

(54) PROVIDING PROTECTED ACCESS TO CRITICAL MEMORY REGIONS

(75) Inventors: Uday Savagaonkar, Beaverton, OR (US); Travis T. Schluessler, Hillsboro, OR (US); Hormuzd Khosravi, Portland, OR (US); Ravi Sahita, Beaverton, OR (US); Gayathri Nagabhushan, Portland, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,913

(22) Filed: Dec. 23, 2011

(65) Prior Publication Data

US 2012/0102285 A1 Apr. 26, 2012

Related U.S. Application Data

(63) Continuation of application No. 11/647,025, filed on Dec. 27, 2006, now Pat. No. 8,099,574.

(51) Int. Cl.
*G06F 12/00* (2006.01)
(52) U.S. Cl. .......................... 711/163; 711/154; 711/170
(58) Field of Classification Search .................. 711/154, 711/163, 170
See application file for complete search history.

(56) References Cited

U.S. PATENT DOCUMENTS

| | | | |
|---|---|---|---|
| 7,412,702 B1 * | 8/2008 | Nelson et al. ..................... 718/1 |
| 2004/0205203 A1 | 10/2004 | Peinado et al. |
| 2005/0039180 A1 | 2/2005 | Fultheim et al. |
| 2005/0289282 A1 * | 12/2005 | Ouriel et al. ...................... 711/1 |
| 2006/0004944 A1 | 1/2006 | Vij et al. |
| 2006/0026389 A1 * | 2/2006 | Dinechin et al. .............. 712/200 |
| 2006/0123184 A1 * | 6/2006 | Mondal et al. .................... 711/6 |
| 2006/0259292 A1 * | 11/2006 | Solomon et al. ................ 703/27 |
| 2007/0005992 A1 | 1/2007 | Schluessler et al. |
| 2007/0156986 A1 * | 7/2007 | Neiger et al. ................. 711/163 |

FOREIGN PATENT DOCUMENTS

EP 0859319 8/1998

OTHER PUBLICATIONS

Office Action for European Application No. 07254927.2 mailed Sep. 10, 2009, 5 pages.
European Search Report for European Application No. 07254927.2 mailed Jul. 17, 2009, 7 pages.
Office Action for U.S. Appl. No. 11/647,025 mailed Jun. 18, 2009, 15 pages.
Office Action for Chinese Application No. 200710303580.1 mailed Oct. 16, 2009, 6 pages.

(Continued)

*Primary Examiner* — Matthew Bradley
(74) *Attorney, Agent, or Firm* — Blakely, Sokoloff, Taylor & Zafman LLP (57) ABSTRACT

In accordance with disclosed embodiments, there are provided methods, systems, and apparatuses for implementing hardware of a virtualized processor based system detecting a specified type of memory access to an identified region of memory and in response to the detecting generating an interrupt for a virtual machine monitor (VMM) of the virtualized processor based system.

20 Claims, 4 Drawing Sheets

OTHER PUBLICATIONS

Office Action for EP Application No. 07254927.2 mailed Nov. 4, 2010, 5 pages.

Office Action for Application No. 07254927.2 dated May 27, 2011, 4 pages.

Office Action for Application No. 07254927.2 dated Oct. 25, 2011, 4 pages.

Office Action for U.S. Appl. No. 11/647,025 dated May 26, 2010, 15 pages.

Office Action for Application No. 07254927.2 dated Mar. 16, 2012, 4 pages.

* cited by examiner

PRIOR ART

Figure 1: Virtualized Processor Based System

Figure 2: Virtualized Processor Based System with Protected Memory Regions

Figure 4

PROVIDING PROTECTED ACCESS TO CRITICAL MEMORY REGIONS

CLAIM OF PRIORITY

This application is a continuation of, and claims priority to the utility application entitled "PROVIDING PROTECTED ACCESS TO CRITICAL MEMORY REGIONS," filed on Dec. 27, 2006, having an application Ser. No. 11/647,025 now U.S. Pat. No. 8,099,574, the entire contents of which are incorporated herein by reference.

The present application is related to U.S. patent application Ser. No. 10/881,777 entitled "SYSTEM AND METHOD FOR SECURE INTER-PLATFORM AND INTRA-PLATFORM COMMUNICATIONS,", and is further related to U.S. patent application Ser. No. 11/173,851 entitled "SIGNED MANIFEST FOR RUN-TIME VERIFICATION OF SOFTWARE PROGRAM IDENTITY AND INTEGRITY," each referenced application assigned to the assignee of the present invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to methods and systems for providing protected access to critical memory regions.

BACKGROUND

In most processor based systems, any system software or program executing in a privileged mode, such as for example in "ring 0," has access to critical resources of the system, including images of other programs executing on the system and data, including data of other programs, present on the system either in memory or in other storage. As is known, undesired software or malware such as a Trojan, worm, virus, etc. may be able to breach the security of an operating system by modifying, disabling, or circumventing the execution of such a program executing in privileged mode in memory. For example, a very large fraction of the vulnerabilities addressed by patches to Microsoft® Windows® in 2003 and 2004 were related to in memory modification of programs or portions of the operating system.

It is possible to verify the integrity of a program prior to its being loaded in memory using a method such as that described in currently pending U.S. patent application Ser. No. 11/173,851. However such verification cannot prevent in-memory modification of executing programs.

Direct protection of memory in which such privileged programs may execute is possible, but existing mechanisms add performance penalties to the operation of the system and/or require the maintenance of additional structures in memory.

Virtualization is a technique that enables a processor based host machine to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualized systems provide guest software operating in a virtual machine with a set of resources (e.g., processors, memory, I/O devices) and may map some or all of the components of a physical host machine into the virtual machine, or create fully virtual components. The virtualization system may thus be said to provide a virtual bare machine interface to guest software. In some embodiments, virtualization systems may include a virtual machine monitor (VMM) which controls the host machine. The VMM provides guest software operating in a virtual machine (VM) with a set of resources such as processors, memory, and I/O devices. The VMM may map some or all of the components of a physical host machine into the virtual machine, and may create fully virtual components, emulated in software in the VMM, which are included in the virtual machine (e.g., virtual I/O devices).

A privileged program as described above may then execute within a VM of the virtualized system, within a privileged environment within the VM. For example, if a Linux operating system is running within one VM of a virtualized system, a privileged program may execute within ring-0 or ring-3 of the Linux-based VM.

Processors such as Intel® processors and others may be designed in general to allow data from memory to be cached by the processor. Additionally, accesses to data in memory may require one or more actions to be taken with regard to the contents of caching structures in the system processor or processors. These actions are referred to herein as snooping characteristics. Furthermore, certain processors may select to allow dynamic reordering of memory accesses. The type of caching (cacheability), if any, used by the processor to access a location in memory, the snooping characteristics and whether dynamic reordering of memory accesses is enabled for that location determines certain behaviors of the memory location, such as for example whether the memory location supports ordering operations or side-effects of reads correctly. These attributes and others that relate to memory behavior are called a memory type and may be specified for a given memory location and access event using a variety of system flags and registers. Memory types may include, for example, "uncacheable", "write combining", "write through", "write back", and "write protect". Memory type range registers (MTRRs), a page attribute table, page tables and other processor control register fields may determine, for each memory access, the relevant memory type for the linear or physical address being accessed. The communication protocols utilized by a processor may vary depending on the memory type of the memory location being accessed.

DETAILED DESCRIPTION

In one embodiment a virtualization system may have support in hardware for virtualization. In this embodiment, the VMM uses facilities in a hardware virtualization architecture to provide services to a virtual machine and to provide protection from and between multiple virtual machines executing on the host machine. Generally, the memory space in which the VMM operates is a part of host physical memory that is not accessible to any of the virtual machines that are serviced by the VMM.

Figure 1:
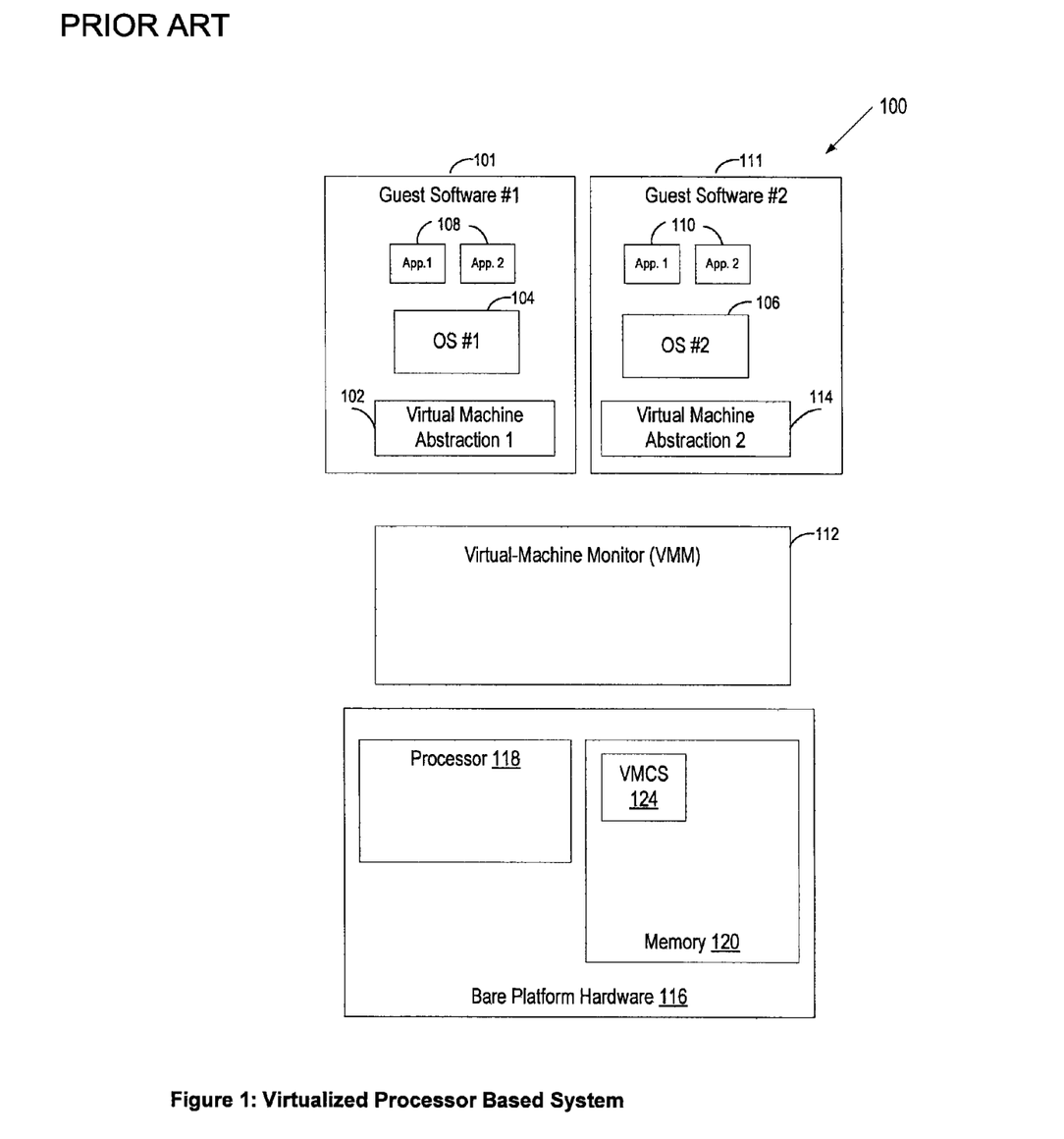
FIG. 1 depicts a virtualization environment in one embodiment.

FIG. 1 illustrates one embodiment of a virtual-machine environment 100. In this embodiment, a processor-based platform. or "bare platform" 116 may execute a VMM 112. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 112 may be run within, or using the services of, another VMM. VMMs may be implemented, for example, in hardware, software, firmware or by a combination of various techniques in some embodiments.

The platform hardware 116 may be a personal computer (PC), mainframe, handheld device such as a personal digital assistant (PDA) or "smart" mobile phone, portable computer, set top box, or another processor-based system. The platform hardware 116 logically includes at least a processor 118 and memory 120. Processor 118 may be any type of processor capable of executing programs, such as a microprocessor, digital signal processor, microcontroller, or the like. The processor may include microcode, programmable logic or hard coded logic for execution in embodiments. Although FIG. 1 shows only one such processor 118, there may be one or more processors in the system in an embodiment. Additionally, processor 118 may include multiple cores, support for multiple threads, or the like. Memory 120 can comprise a hard disk, a floppy disk, random access memory (RAM), read only memory (ROM), flash memory, any combination of the above devices, or any other type of machine medium readable by processor 118 in various embodiments. Memory 120 may store instructions and/or data for performing program execution and other method embodiments.

The VMM 112 presents to guest software an abstraction of one or more virtual machines, which may provide the same or different abstractions to the various guests. FIG. 1 shows two virtual machines, 102 and 114. Guest software such as guest software 101 and 111 running on each virtual machine may include a guest OS such as a guest OS 104 or 106 and various guest software applications 108 and 110. Guest software 101 and 111 may access physical resources (e.g., processor registers, memory and I/O devices) within the virtual machines on which the guest software 101 and 111 is running and to perform other functions. For example, the guest software 101 and 111 expects to have access to all registers, caches, structures, I/O devices, memory and the like, according to the architecture of the processor and platform presented in the virtual machine 102 and 114.

In one embodiment, the processor 118 controls the operation of the virtual machines 102 and 114 in accordance with data stored in a virtual machine control structure (VMCS) 124. The VMCS 124 is a structure that may contain state of guest software 101 and 111, state of the VMM 112, execution control information indicating how the VMM 112 wishes to control operation of guest software 101 and 111, information controlling transitions between the VMM 112 and a virtual machine, etc. The processor 118 reads information from the VMCS 124 to determine the execution environment of the virtual machine and to constrain its behavior. In one embodiment, the VMCS 124 is stored in memory 120. In some embodiments, multiple VMCS structures are used to support multiple virtual machines.

Resources that can be accessed by guest software (e.g., 101, including guest OS 104 and application 108) may either be classified as "privileged" or "non-privileged." For privileged resources, the VMM 112 facilitates functionality desired by guest software while retaining ultimate control over these privileged resources. Further, each guest software 101 and 111 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 112 to ensure proper operation of virtual machines 102 and 114 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

Figure 2:
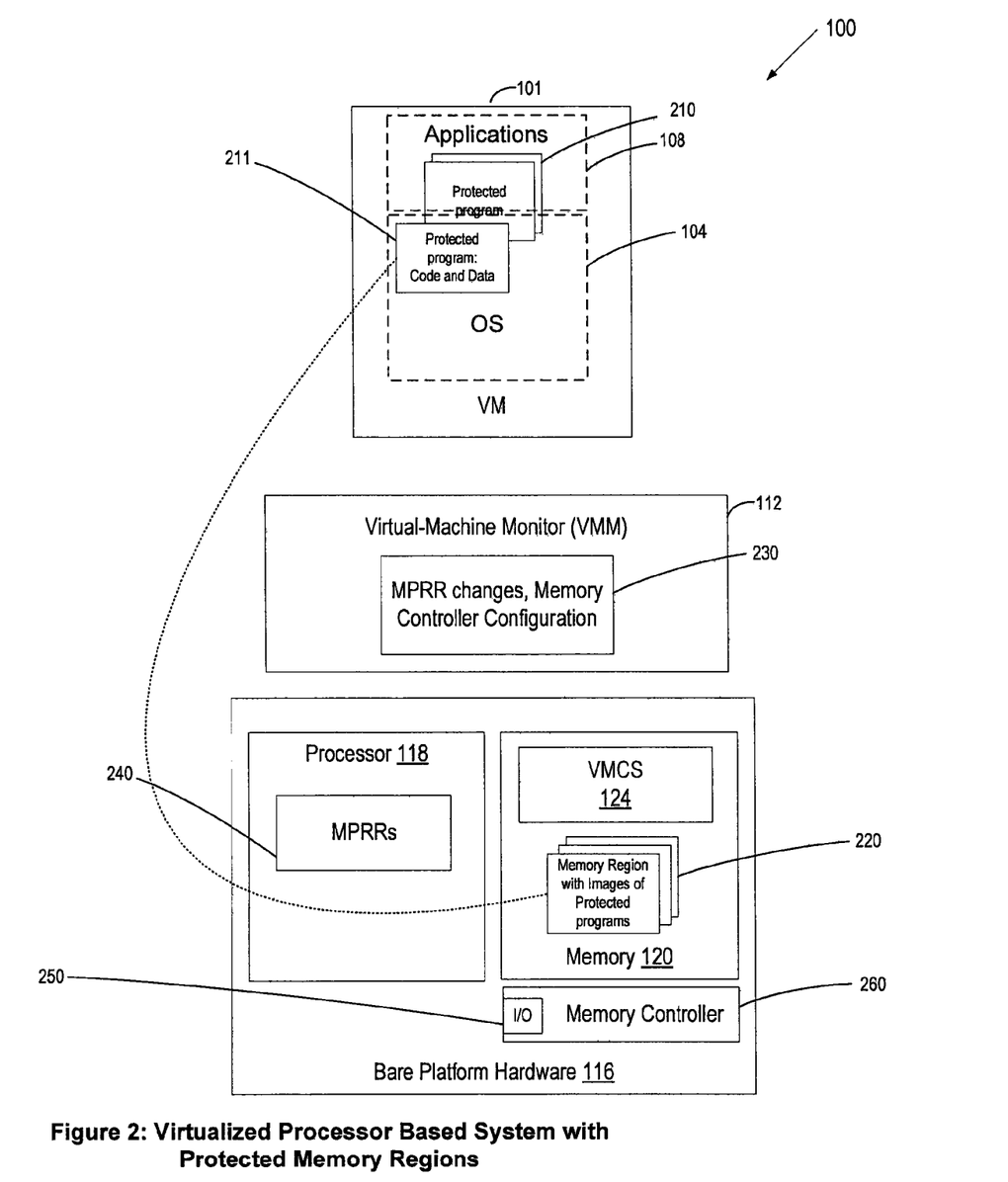
FIG. 2 depicts a virtualization environment with protected memory regions in one embodiment.

FIG. 2 depicts the system of FIG. 1 in further detail. In the system 100, for clarity, only one of the VMs 101 is shown. In the embodiment, the VM 101 includes applications 108 and an OS 104. One or more of the applications, or a part of the OS may be one of a set of protected programs, 210, for which memory image protection is desired. A protected program such as the one depicted at 211, may include code and data. Of course, it should be clear that the blocks 210 and 211 are abstract representations of program code and data. In general, the program code and data may reside on a storage device such as a disk drive, flash drive or other storage, and then be loaded into memory 120 for execution. When such program code and data is loaded into memory, it may occupy a region or set of regions of one or more possibly different memories such as depicted at 220. Protection of the protected programs may then include protection of the range of memory locations or regions at 220.

In one embodiment, hardware based protection mechanisms may be used to attempt to prevent memory based attacks on protected programs. In such mechanisms, one or more registers in the processor or processors 118, at 240, may be used to specify memory ranges that need to be protected. These registers may be one or multiple registers and may use a variety of encoding schemes to specify ranges of memory locations that need to be protected and various types of memory access protections. In other embodiments, a memory controller 260 may be used to selectively block certain types of access to certain ranges of memory. In some embodiments such as the one depicted in FIG. 2, both mechanisms may be present.

The basic modes for memory access in this embodiment are:
1. No access: when a region of memory is marked as no-access, any references to this region would generate an action such as an interrupt, fault, or exception signal.
2. Read-only access: when a region of memory is marked as read-only, read access to that region may proceed without any actions. However, any attempt to modify memory in that region would generate an action.
3. No protection: if a region of memory is marked with the no-protection attribute, any type of access to that region is allowed, and proceeds without generation of actions on access.

In an embodiment using special purpose registers in hardware such as those depicted at 240 in FIG. 2, an architecture for a processor such as the x86 architecture may be extended or modified to include a capability for memory protection based in part on the existing capability for memory type specification, the Memory Type Range Registers (MTRR). The new capability may be termed Memory Protection Range Registers (MPRR) and be based on an existing MTRR capability in an x86 family architecture, or be created as an entirely new capability.

In a manner similar to that used in the MTRR capability and as is known in the art, MPRR in one embodiment would support three basic modes of operations for a memory region in the embodiment. Bit fields in the MPRR registers to specify memory ranges and an access mode for each memory range, in one embodiment. Many specific means of implementing this method of specifying memory ranges for protection will be apparent to one skilled in the art. In this embodiment, once a memory range and a memory access mode for the range are specified, an access to the memory in a specified range in a manner inconsistent with the specified access mode causes an exception invoking the VMM.

In another embodiment, a memory controller such as that depicted at 260 may be used to specify protected memory ranges and access modes for such ranges. The chipset or other hardware implementing the memory control logic and depicted by block 260 in FIG. 2 may include a capability for configuration so as to allow the memory controller chipset in this embodiment to selectively block or allow certain types of memory access to certain ranges of memory locations or page addresses. Thus, the memory controller logic may support multiple modes of access to memory and raise an exception or generate an event in response to an access inconsistent with the specified modes for pages in the specified range of memory locations.

One potential problem with the use of a memory controller as described above to protect memory ranges is that the memory controller in general is unable to respond to accesses made to a memory location if the access is made after the contents of the location have been cached, and takes place in the cache. It is then possible for a malicious program or malware to modify the contents of cache outside the visibility of the memory controller. In such instances, the memory controller changes may be augmented with additional configurations of a memory type system such as by setting fields and values in the MTRRs in an x86 embodiment. This process then controls the properties of the cached contents of protected memory regions. Thus, for example, in such an embodiment, memory pages designated "no access" by chipset configuration would be designated "uncacheable" in the MTRRs; those pages designated "read-only access" by chipset configuration would be designated either "uncacheable", "write through" or "write protect" using the MTRRs. In each of these cases, the designation would prevent the caching of the pages, or prevent writes to those pages in the cache, or force a write to memory on a write to cache, respectively. In other embodiments, a similar protection system for cached contents of memory may be used, however the terms and mechanisms used may differ. The VMM may be used to ensure consistency between the protections specified for memory ranges to the memory controller and the cached memory types specified to the MTRRs. This is achieved by its invocation at configuration time, when the memory controller is configured for memory protection; and by its invocation at a time when the memory controller configuration is cleared.

A special I/O port exposed by the memory controller logic may be used to configure the various memory regions in some embodiments; alternatively in other embodiments, the memory controller may be made responsive to some special Advanced Programmable Interrupt Controller (APIC) transactions, or their equivalent, in order to specify memory ranges and access modes for memory protection. An access to a range of memory that was thus protected and inconsistent with the mode of access specified for the range would then create an exception or interrupt for the VMM of the system. Processing following such an interrupt is described below with reference to FIG. 3.

It is additionally critical that the specification of the memory ranges and their access modes are also protected actions. Thus, in an embodiment where MPRRs are used to specify protected memory ranges, an instruction to modify the MPRRs may generate a VMEXIT, or an interrupt serviceable only by the VMM. For example, the x86 instruction WRMSR is used to modify MTRRs, and may be extended to modify and set values in fields for the MPRRs. Thus, an invocation of the WRMSR instruction within an VM may cause an interrupt into the VMM, thereby allowing the VMM to inspect the WRMSR instruction for an incorrect or malicious modification of the MPRRs.

Similarly, in embodiments where a memory controller chipset or logic is used to perform memory protection, accesses to a special I/O port or the execution of an APIC transaction or its equivalent to configure memory protection would automatically cause a VMEXIT to allow VMM supervision of such actions.

Figure 3:
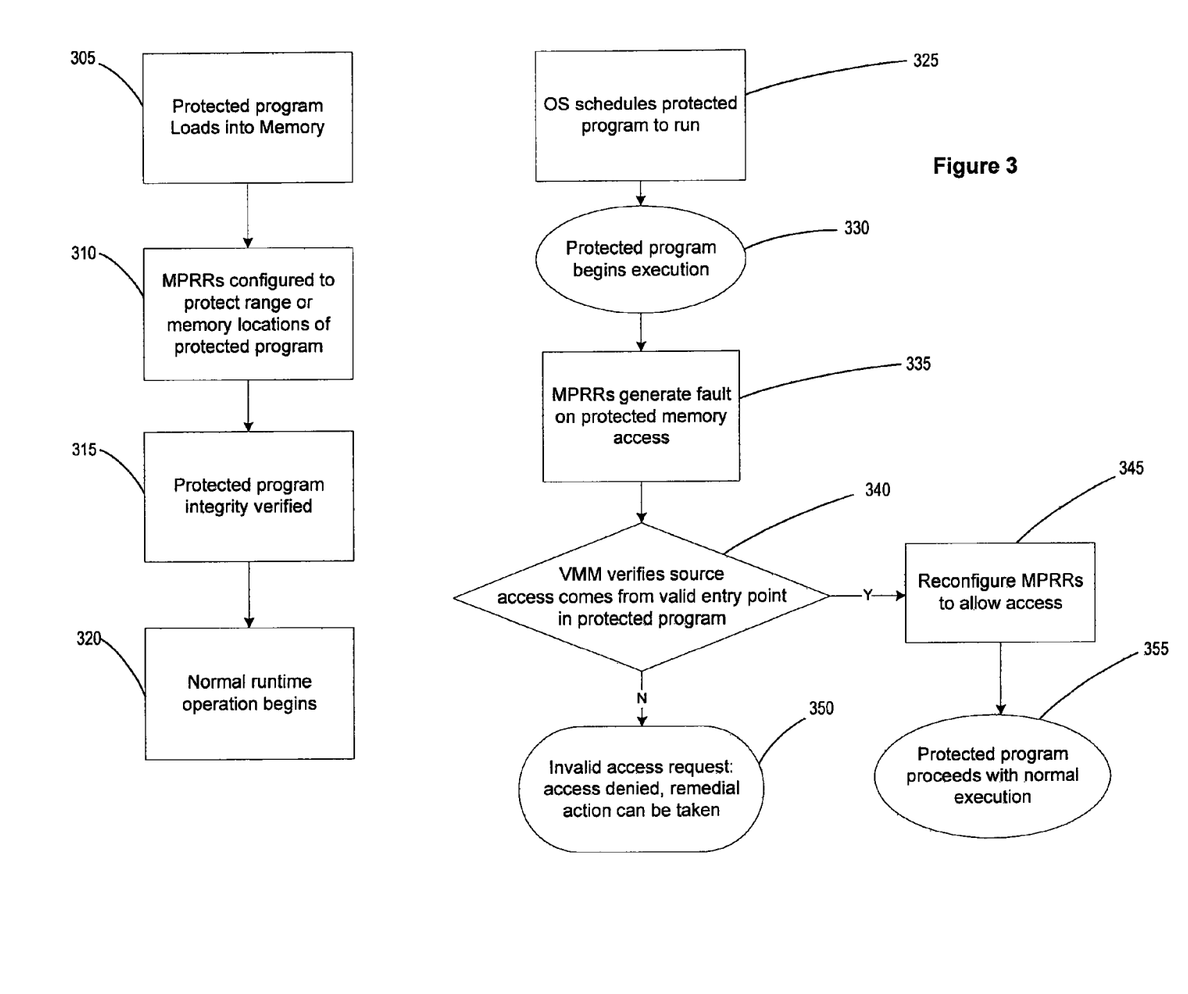
FIG. 3 depicts a flow of processing in one embodiment.

FIG. 3 depicts at a high level the processing that occurs, first when a protected program is loaded into memory (at 305-320) and then, when the protected program is scheduled to run in a VM (at 325-355) in one embodiment.

When a protected program is loaded into memory at 305, the OS in the VM may configure the MPRRs in this embodiment to protect the range of memory locations of the protected program. This action in general is intercepted by the VMM which may then verify the validity of the request, and of the program for which protection is requested. Program integrity may be verified prior to its being loaded into memory at 315 in a manner such as that described in commonly assigned application Ser. No. 11/173,851 referenced above in Related Applications. Control may then be returned to the VM at 320 for normal runtime operation.

During such operation, at 325, the protected program may be scheduled to execute. Once the program begins execution, 330, in some cases, a protection violation may occur. This would be in general an attempt by a process executing in the VM to access the protected portions of the program, including an unexpected access by the program to access parts of its code or data. This violation would in this embodiment trigger an exception or VMEXIT, for one instance, causing control to return to the VMM at 335. At this point, the VMM may then verify the location of the access, and source from which the access originates, 340, and determine if the access is allowable. If it is allowable, the VMM may then reconfigure the MPRRs to allow access, 345, and the protected program may resume normal execution after control returns to the VM, 335. Otherwise, the VMM may take other actions such as generating a system fault, aborting the program in the VM, or may take many other remedial actions such as notification of an alert program, sending a message to an administrator, or logging the event, and others as is known, to prevent and/or record a potentially harmful action in VM memory, at 350.

The actions in the flowchart of FIG. 3 are specific to one embodiment. In other embodiments, the MPRR configuration step at 310 may be replaced by a configuration of a memory controller chipset as previously described, to achieve a similar protection of memory ranges, and a concurrent reconfiguration of cache type control registers such as MTRRs, as previously described. In this embodiment, the fault generation at 335 may occur as described due to either the memory controller chipset or the MTRRs signaling an access to a protected memory location or its cached content in the processor cache. Many other variations are possible.

Figure 4:
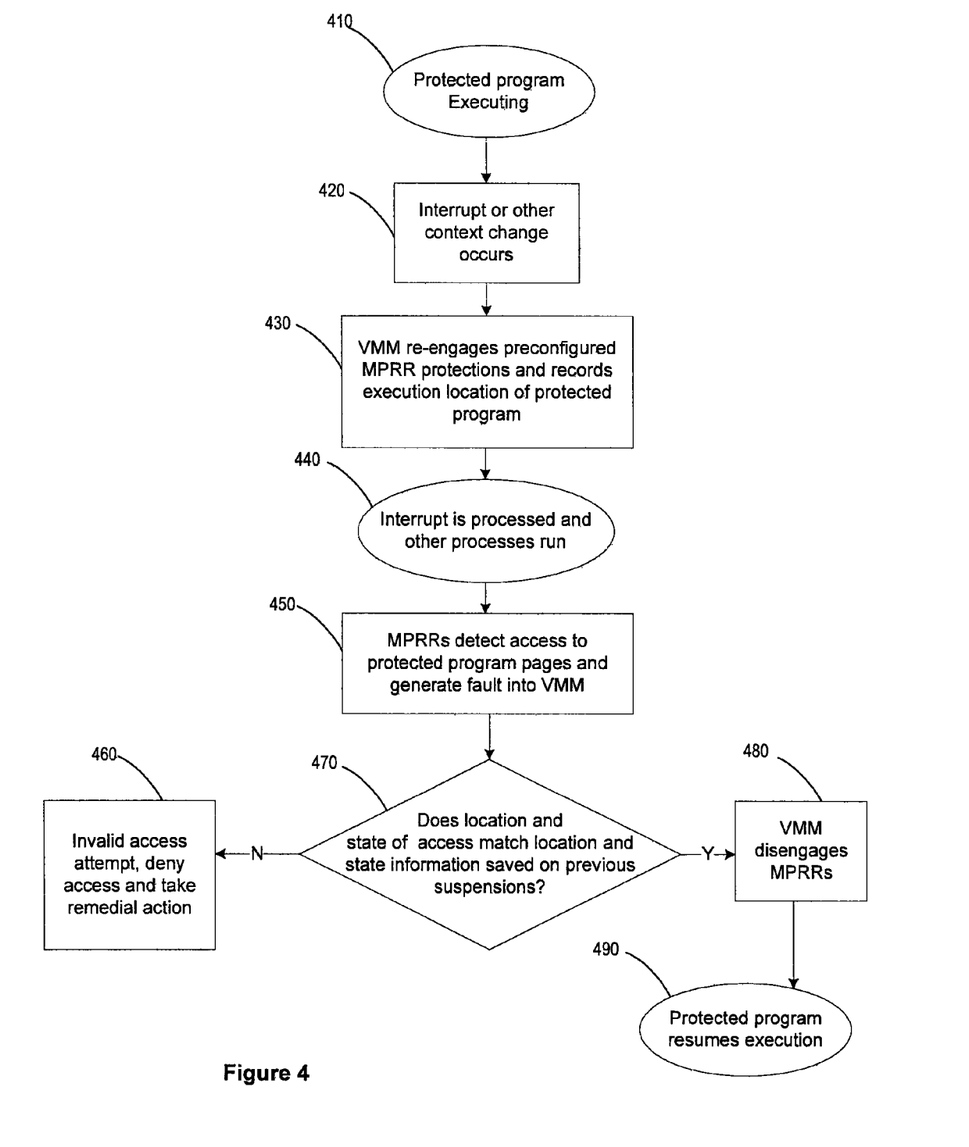
FIG. 4 depicts a flow of processing in one embodiment.

FIG. 4 depicts processing in one embodiment showing how context changes are handled when memory protection is active in a system such as described above. If a protected program is executing, 410, and an interrupt or other context change occurs, 420, the VMM may then reset the MPRRs to a predetermined configuration and records the execution location of any protected program that was executing at the time, 430. Once the interrupt is processed, and other processes execute following the interrupt servicing, 440, the MPRRs may subsequently detect a violation of the protected memory ranges as before, at 450. The processing that then occurs is similar to that shown in FIG. 3. At this point, the VMM may then verify the location of the access, and source from which the access originates, 470, and determine if the access is allowable. In addition, the location and state of access is compared to the state saved before the context switch. If the state matches, that is if the access is allowable, the VMM may then reconfigure the MPRRs to allow access, or disengage them, 480, and the protected program may resume normal execution after control returns to the VM, 490. Otherwise, the VMM may take other actions such as generating a system fault, aborting the program in the VM, or may take many other remedial actions as is known, to prevent a potentially harmful action in VM memory, at 460.

As before, many variations of the embodiments based on a VMM are possible. The virtual machines shown in FIG. 1 are only one representation of one embodiment, in other embodiments, the actual number of virtual machines executing on a host machine may vary from one to many. Portions of the VMM and the VMCS may be implemented in hardware or in software to different extents in different embodiments. The basic functions provided by the VMM may vary in some embodiments. Each embodiment may define a different set of virtualization events. The processing described above takes place in an embodiment based on x86 concepts and functionality. However, other embodiments are possible in other architectures that have similar or equivalent functionality. Many different data structures and algorithmic flows may be used in embodiments. In some embodiments, the memory range registers may not be present; in others the access controller may not be present. The actions taken on finding an invalid access may vary. In some embodiments, an error message, halt, or kernel panic may be generated. In others, a warning may be logged.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above is presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. In a smart mobile phone device having a memory and a processor therein, a method comprising:
   executing a virtual machine monitor to service one or more virtual machines, wherein the virtual machine monitor operates in a first part of the memory that is not accessible to any of the one or more virtual machines that are serviced by the virtual machine monitor;
   loading a protected program for one of the virtual machines into a second part of the memory; and
   protecting the protected program based on a range of memory locations or regions occupied by the protected program, wherein protecting the protected program comprises:
   (a) specifying in one or more registers of the processor, the range of memory locations or regions to be protected, and
   (b) selectively blocking a memory access attempt to the range of memory locations or regions to be protected based on an access type for the memory access attempt and based further on the memory access attempt having a location within the range of memory locations or regions to be protected.

2. The method of claim 1, wherein specifying in the one or more registers of the processor, the range of memory locations or regions to be protected comprises:
   configuring Memory Type Range Registers (MTRRs) or Memory Protection Range Registers (MPRRs) of the processor.

3. The method of claim 1, wherein specifying in the one or more registers of the processor, the range of memory locations or regions to be protected comprises:
   specifying the range of memory locations or regions to be protected and an access mode for each memory range in bit fields of the one or more registers of the processor.

4. The method of claim 1, wherein protecting the protected program further comprises:
   (c) generating an interrupt to the virtual machine monitor.

5. The method of claim 1, wherein protecting the protected program further comprises:
   (c) raising an exception or generating an event in response to the memory access attempt being inconsistent with a specified access mode for pages in the range of memory locations or regions to be protected.

6. The method of claim 1, further comprising:
   running guest software within each of the one or more virtual machines; and
   presenting, via the virtual machine manager, an abstraction of the one or more virtual machines to the respective guest software running within each of the one or more virtual machines.

7. The method of claim 6, wherein the guest software running within each of the one or more virtual machines comprises an operating system and software.

8. The method of claim 1, wherein each of the one or more virtual machines includes one or more applications and an operating system, and wherein the protected program comprises one or more of the applications or at least a part of the operating system.

9. The method of claim 1, wherein protecting the protected program further comprises:
   (c) instituting remedial actions including one or more of:
   generating a system fault;
   aborting a program in one of the virtual machines associated with the memory access attempt;
   triggering a notification of an alert program;
   sending a message to an administrator; and
   logging an event based on the memory access attempt.

10. The method of claim 1:
    wherein selectively blocking the memory access attempt comprises denying the memory access attempt when a source of the memory access attempt is an invalid entry point for a program; and
    wherein protecting the protected program further comprises:
    (c) reconfiguring the one or more registers of the processor to allow the memory access attempt when the source of the memory access attempt is a valid entry point into the program; and
    (d) performing a notification action based on the selectively blocking or the reconfiguring being performed.

11. The method of claim 1, wherein the access type for the memory access attempt comprises one of a no memory access type, a read only memory access type, and a no protection memory access type.

12. One or more non-transitory machine readable memories having instructions stored therein that, when executed by a processor of a portable device, the instructions cause the portable device to perform operations comprising:
    executing a virtual machine monitor to service one or more virtual machines, wherein the virtual machine monitor operates in a first part of the one or more memories that is not accessible to any of the one or more virtual machines that are serviced by the virtual machine monitor;
    loading a protected program for one of the virtual machines into a second part of the one or more memories; and
    protecting the protected program based on a range of memory locations or regions occupied by the protected program, wherein protecting the protected program comprises:
    (a) specifying in one or more registers of the processor, the range of memory locations or regions to be protected, and
    (b) selectively blocking a memory access attempt to the range of memory locations or regions to be protected based on an access type for the memory access attempt and based further on the memory access attempt having a location within the range of memory locations or regions to be protected.

13. The one or more non-transitory machine readable memories having instructions stored therein as in claim 12, wherein the portable device comprises one of a handheld smart mobile phone device or a handheld personal digital assistant.

14. The one or more non-transitory machine readable memories having instructions stored therein as in claim 12:
    wherein specifying in the one or more registers of the processor, the range of memory locations or regions to be protected comprises:

configuring Memory Type Range Registers (MTRRs) or Memory Protection Range Registers (MPRRs) of the processor.

15. The one or more non-transitory machine readable memories having instructions stored therein as in claim 12:
wherein specifying in the one or more registers of the processor, the range of memory locations or regions to be protected comprises:
specifying the range of memory locations or regions to be protected and an access mode for each memory range in bit fields of the one or more registers of the processor.

16. A portable computing device comprising:
a processor;
a memory;
a virtual machine monitor to service one or more virtual machines, wherein the virtual machine monitor to operate in a first part of the memory that is not accessible to any of the one or more virtual machines serviced by the virtual machine monitor;
a protected program for one of the virtual machines to execute in a second part of the memory;
a memory controller to protect the protected program based on a range of memory locations or regions occupied by the protected program within the second part of the memory,
wherein the memory controller to protect the protected program comprises:
(a) the memory controller to identify via one or more hardware registers, the range of memory locations or regions to be protected, and
(b) the memory controller to selectively block a memory access attempt to the range of memory locations or regions to be protected based on an access type for the memory access attempt and based further on the memory access attempt having a location within the range of memory locations or regions to be protected.

17. The portable computing device of claim 16, wherein the portable device comprises one of a handheld smart mobile phone device or a handheld personal digital assistant.

18. The portable computing device of claim 16, wherein the memory controller to identify via one or more hardware registers, the range of memory locations or regions to be protected comprises:
the memory controller to configure Memory Type Range Registers (MTRRs) or Memory Protection Range Registers (MPRRs) to specify the range of memory locations or regions to be protected.

19. The portable computing device of claim 16, wherein the memory controller to identify via one or more hardware registers, the range of memory locations or regions to be protected comprises:
the memory controller to identify the range of memory locations or regions to be protected and to further identify an access mode for each memory range via bit fields of the one or more registers.

20. The portable computing device of claim 16,
wherein the memory controller to selectively block the memory access attempt to the range of memory locations or regions to be protected comprises memory controller to deny the memory access attempt when a source of the memory access attempt is an invalid entry point for a program; and
wherein the memory controller to further:
(c) reconfigure the one or more registers to allow the memory access attempt when the source of the memory access attempt is a valid entry point into the program; and
(d) perform a notification action based on the denial or the reconfiguration being performed.

* * * * *